US011562212B2

(12) United States Patent
Wang et al.

(10) Patent No.: US 11,562,212 B2
(45) Date of Patent: Jan. 24, 2023

(54) PERFORMING XNOR EQUIVALENT OPERATIONS BY ADJUSTING COLUMN THRESHOLDS OF A COMPUTE-IN-MEMORY ARRAY

(71) Applicant: QUALCOMM Incorporated, San Diego, CA (US)

(72) Inventors: Zhongze Wang, San Diego, CA (US); Edward Teague, San Diego, CA (US); Max Welling, Bussum (NL)

(73) Assignee: Qualcomm Incorporated, San Diego, CA (US)

( * ) Notice: Subject to any disclaimer, the term of this patent is extended or adjusted under 35 U.S.C. 154(b) by 685 days.

(21) Appl. No.: 16/565,308

(22) Filed: Sep. 9, 2019

(65) Prior Publication Data

US 2021/0073619 A1 Mar. 11, 2021

(51) Int. Cl.
*G06N 3/04* (2006.01)
*G06N 3/08* (2006.01)

(52) U.S. Cl.
CPC ......... *G06N 3/0481* (2013.01); *G06N 3/084* (2013.01)

(58) Field of Classification Search
CPC .......... G06N 3/02; G06N 3/0481; G06N 3/06; G06N 3/08; G06N 3/084
See application file for complete search history.

(56) References Cited

U.S. PATENT DOCUMENTS

| | | | | |
|---|---|---|---|---|
| 5,444,822 | A * | 8/1995 | Shinohara | G06N 3/063 706/41 |
| 10,650,806 | B2 * | 5/2020 | Faubel | G10L 25/21 |
| 10,699,778 | B2 * | 6/2020 | Yu | G06N 3/063 |
| 10,949,736 | B2 * | 3/2021 | Deisher | G06N 3/0454 |
| 2018/0315473 | A1 | 11/2018 | Yu et al. | |
| 2019/0205729 | A1 | 7/2019 | Tran et al. | |
| 2021/0073619 | A1 * | 3/2021 | Wang | G06N 3/084 |
| 2021/0397930 | A1 * | 12/2021 | Kulkarni | G11C 11/409 |

OTHER PUBLICATIONS

International Search Report and Written Opinion—PCT/US2020/049754—ISA/EPO—dated Jan. 13, 2021.

* cited by examiner

*Primary Examiner* — Hosuk Song
(74) *Attorney, Agent, or Firm* — Seyfarth Shaw LLP (57) ABSTRACT

A method performs XNOR-equivalent operations by adjusting column thresholds of a compute-in-memory array of an artificial neural network. The method includes adjusting an activation threshold generated for each column of the compute-in-memory array based on a function of a weight value and an activation value. The method also includes calculating a conversion bias current reference based on an input value from an input vector to the compute-in-memory array, the compute-in-memory array being programmed with a set of weights. The adjusted activation threshold and the conversion bias current reference are used as a threshold for determining the output values of the compute-in-memory array.

20 Claims, 7 Drawing Sheets

PERFORMING XNOR EQUIVALENT OPERATIONS BY ADJUSTING COLUMN THRESHOLDS OF A COMPUTE-IN-MEMORY ARRAY

BACKGROUND

Field

Aspects of the present disclosure generally relate to performing XNOR-equivalent operations by adjusting column thresholds of a compute-in-memory array of an artificial neural network.

Background

Very low bit width neural networks, such as binary neural networks (BNNs), are powerful new approaches in deep neural networking (DNN). Binary neural networks can significantly reduce data traffic and save power. For example, the memory storage for binary neural networks is significantly reduced because both the weights and neuron activations are binarized to −1 or +1, as compared to floating/fixed-point precision.

Digital complementary metal-oxide-semiconductor (CMOS) processing, however, uses a [0,1] basis. In order to carry out binary implementations associated with these binary neural networks, the binary network's [−1,+1] basis should be transformed to the CMOS [0,1] basis. The transformation employs a computationally intense exclusive-negative OR (XNOR) operation.

Compute-in-memory systems can implement very low bit width neural networks, such as binary neural networks (BNNs). Compute-in-memory systems have memory with some processing capabilities. For example, each intersection of a bit line and a word line represents a filter weight value, which is multiplied by the input activation on the word line to generate a product. The individual products along each bit line are then summed to generate corresponding output values of an output tensor. This implementation may be deemed multiply accumulate (MAC) operations. These MAC operations can transform the binary network's [−1,+1] basis to the CMOS [0,1] basis.

Conventionally, the transformation with a compute-in-memory system is achieved by completing an XNOR operation at each bit cell. The result along each bit line are then summed to generate corresponding output values. Unfortunately, including an XNOR function in each bit cell consumes a large area and increases power consumption.

In the conventional implementation, each bit cell includes a basic memory function of read and write plus an additional logic function of XNOR between the input and cell state. As a result of including the XNOR capability, the number of transistors for each cell in the memory (e.g., static random-access memory (SRAM)) increases from six or eight to twelve, which significantly increases cell size and power consumption. It would be desirable to eliminate the XNOR operation while still being able to transform from a binary neural network[−1,+1] basis to a CMOS [0,1] basis.

SUMMARY

In one aspect of the present disclosure, an apparatus includes a compute-in-memory array that includes columns and rows. The compute-in-memory array is configured to adjust an activation threshold generated for each column of the compute-in-memory array based on a function of a weight value and an activation value. The compute-in-memory array is also configured to calculate a conversion bias current reference based on an input value from an input vector to the compute-in-memory array. The compute-in-memory array is programmed with a set of weight values. The adjusted activation threshold and the conversion bias current reference are used as a threshold for determining the output values of the compute-in-memory array Another aspect discloses a method for performing XNOR-equivalent operations by adjusting column thresholds of a compute-in-memory array having rows and columns. The method includes adjusting an activation threshold generated for each column of the compute-in-memory array based on a function of a weight value and an activation value. The method also includes calculating a conversion bias current reference based on an input value from an input vector to the compute-in-memory array. The compute-in-memory array is programmed with a set of weight values. The adjusted activation threshold and the conversion bias current reference are used as a threshold for determining the output values of the compute-in-memory array.

In another aspect, a non-transitory computer-readable medium records non-transitory program code. The non-transitory program code, when executed by a processor(s), causes the processor(s) to adjust an activation threshold generated for each column of the compute-in-memory array having rows and columns based on a function of a weight value and an activation value. The program code also causes the processor(s) to calculate a conversion bias current reference based on an input value from an input vector to the compute-in-memory array. The compute-in-memory array is programmed with a set of weight values. The adjusted activation threshold and the conversion bias current reference are used as a threshold for determining the output values of the compute-in-memory array.

Another aspect discloses an apparatus for performing XNOR-equivalent operations by adjusting column thresholds of a compute-in-memory array having rows and columns. The apparatus includes means for adjusting an activation threshold generated for each column of the compute-in-memory array based on a function of a weight value and an activation value. The apparatus also includes means for calculating a conversion bias current reference based on an input value from an input vector to the compute-in-memory array. The compute-in-memory array is programmed with a set of weight values. The adjusted activation threshold and the conversion bias current reference are used as a threshold for determining the output values of the compute-in-memory array.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Compute-in-memory (CIM) is a method of performing a multiply and accumulate (MAC) operation in a memory array. Compute-in-memory may improve parallelism within a memory array by activating multiple rows and using an analog column current to conduct multiplication and summation operations. For example, SRAM bit cells may be customized to enable XNOR and bit-counting operations for binary neural networks.

Conventionally, compute-in-memory binary neural network implementations are achieved by completing XNOR operations at each bit cell and summing the result for each bit cell. Adding an XNOR function in each bit cell increases layout area and increases power consumption. For example, the number of transistors in each cell in the memory (e.g., SRAM) increases from six or eight to twelve.

Aspects of the present disclosure are directed to performing XNOR-equivalent operations by adjusting column thresholds of a compute-in-memory array of an artificial neural network (e.g., a binary neural network). In one aspect, an activation threshold for each column of the memory array is adjusted based on a function of a weight value and an activation value. A conversion bias current reference is calculated based on an input value from an input vector.

In one aspect, a bit line population count is compared to a sum of the conversion bias current reference and the adjusted activation threshold to determine an output of a bit line. The bit line population count is a sum of each output of the bitcells corresponding to a bit line of the memory array. For example, the sum of the output (or population count) of each bitcell associated with a first bit line is provided to the comparator as a first input. The population count is then compared to the sum of the conversion bias current reference and the adjusted activation threshold to determine the output of the bit line. In some aspects, the activation threshold is less than half of a number of rows of the memory array. The number of rows corresponds to a size of the input vector. In some aspects, the conversion bias current reference is less than half of a number of rows of the memory array.

The artificial neural network of the present disclosure may be a binary neural network, a multi-bit neural network, or a very low bit-width neural network. Aspects of the present disclosure may be applicable to devices (e.g., edge devices) that specify very low memory processing and power or large networks that could benefit from memory savings resulting from a binary format. Aspects of the present disclosure reduce size and improve power consumption of the memory by eliminating XNOR operations in compute-in-memory systems that implement binary neural networks. For example, the basis transformation is implemented to avoid use of the XNOR function and its corresponding transistor(s) in each bit cell, thereby reducing the size of the memory.

Figure 1:
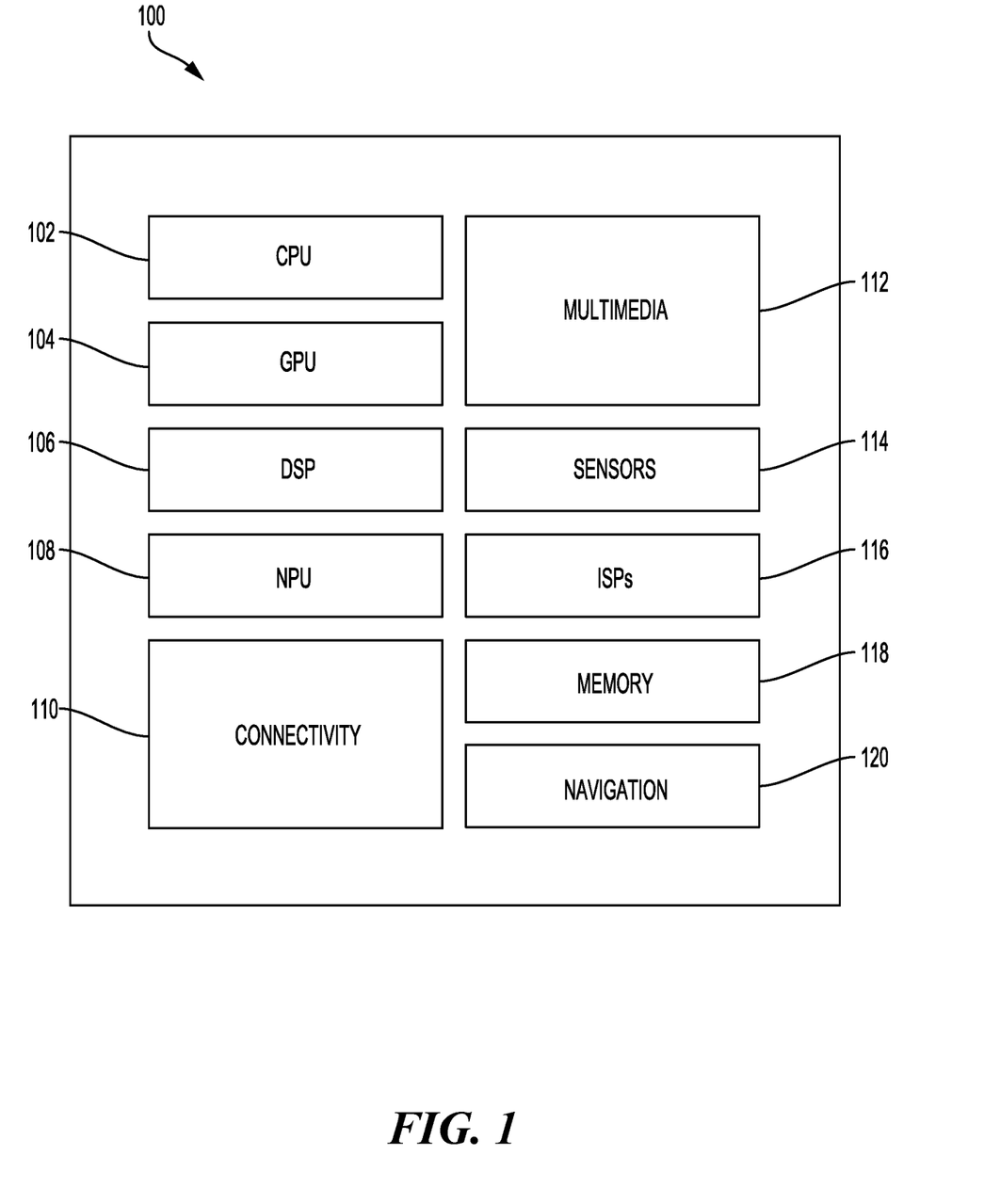
FIG. 1 illustrates an example implementation of designing a neural network using a system-on-a-chip (SOC), including a general-purpose processor in accordance with certain aspects of the present disclosure.

FIG. 1 illustrates an example implementation of a system-on-a-chip (SOC) 100, which may include a central processing unit (CPU) 102 or a multi-core CPU configured for transforming multiply and accumulate operations for a compute-in-memory (CIM) array of an artificial neural network in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to adjust an activation threshold for each column of the array based on a function of a weight value (e.g., a weight matrix) and an activation value. The general-purpose processor 102 may further comprise code to calculate a conversion bias current reference based on an input value from an input vector.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
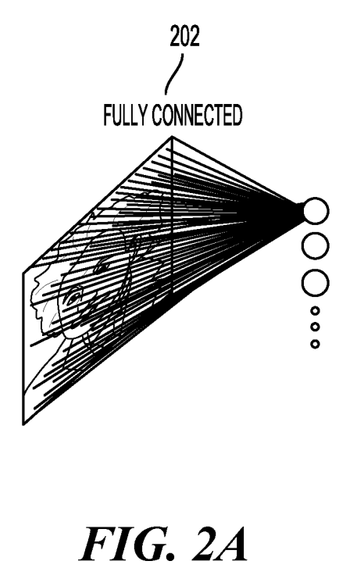
FIGS. 2A, 2B, and 2C are diagrams illustrating a neural network in accordance with aspects of the present disclosure.
Figure 2B:
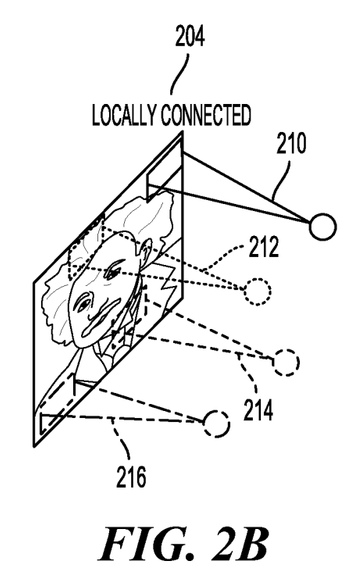

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
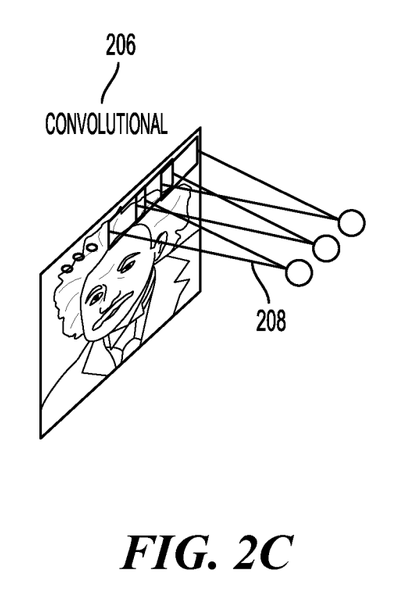

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
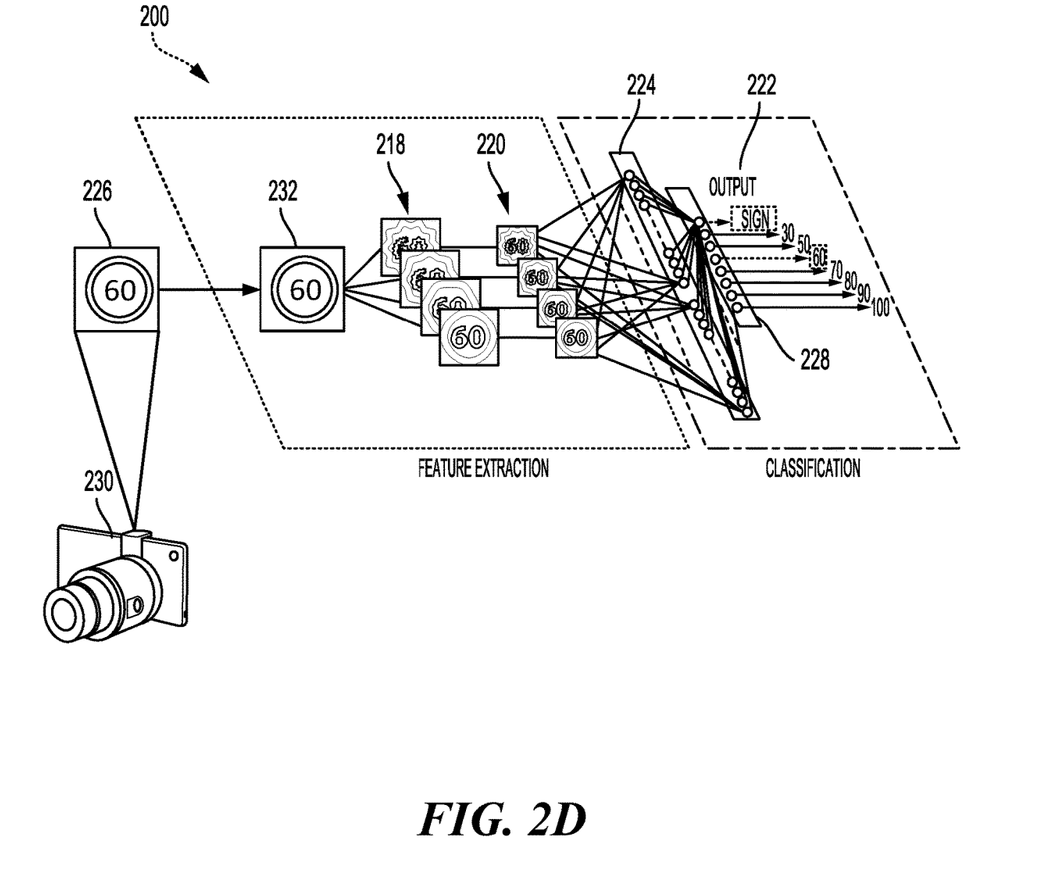
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
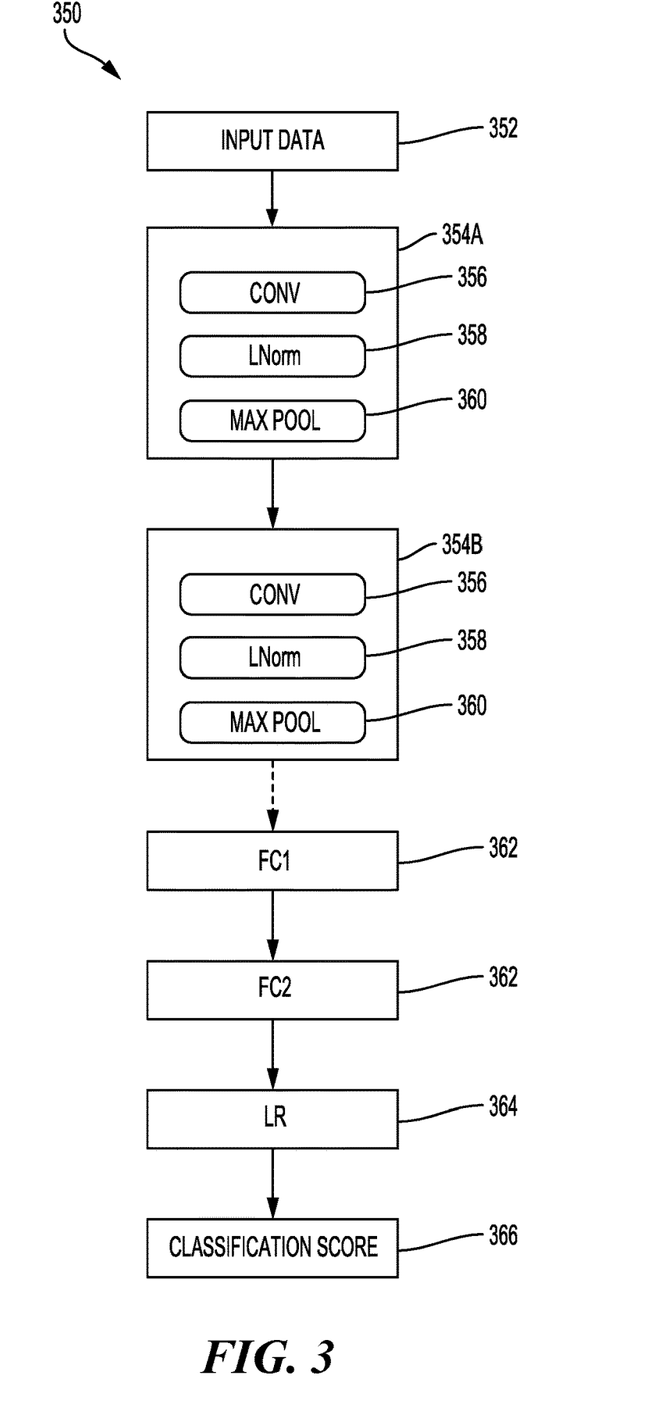
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

The memory storage of artificial neural networks (e.g., binary neural networks) can be significantly reduced when the weights and neuron activations are binarized to −1 or +1 ([−1,+1] space). However, digital complementary metal-oxide-semiconductor (CMOS) logic works in the [0,1] space. Thus, a transformation occurs between digital CMOS devices, which use a [0,1] basis and binary neural networks, which use a [−1, +1] basis during binary implementations.

A memory cell may be configured to support an exclusive-negative OR (XNOR) function. For example, TABLES 1-3 (e.g., truth tables) illustrate mappings of the binary neural network in the [0,1] space to binary multiplication in the binarized [−1, +1] space. A two-input logical function is illustrated in the truth tables 1-3.

TABLE 1 illustrates an example of the binary multiplication in the binarized [−1, +1] space. For example, multiplication in the binarized [−1, +1] space produces a 4-bit output of −1*−1,−1*+1, +1*−1, +1*+1 (e.g., "1,−1,−1,1").

TABLE 1

| Multiply | −1 | +1 |
|---|---|---|
| −1 | +1 | −1 |
| +1 | −1 | +1 |

TABLE 2 illustrates an example of an XNOR implementation. The memory cell may be configured to perform an XNOR function on a first input value (e.g., binary neuron activation) and a second input value (e.g., a binary synaptic weight) to generate a binary output. For example, the XNOR function is only true when all of the input values are true or when all of the input values are false. If some of the inputs are true and others are false, then the output of the XNOR function is false. Thus, when both inputs (e.g., first and second inputs) are false (e.g., the first input is 0 and the second input is 0), as shown in Table 2, the output is true (e.g., 1). When the first input is false (0) and the second input is true (1), the output is false (0). When the first input is true (1) and the second input is false (0), the output is false (0). When the first input is true (1) and the second input is true (1), the output is true (1). Thus, the truth table for the XNOR function with two inputs has a binary output of "1,0,0,1."

Thus, the binary multiplication in the binarized [−1, +1] space maps to the binary output of the XNOR in the [0,1] space. For example, the "1s" in the 4-bit output of the binarized [−1, +1] space maps to the "1s" in the binary output of the XNOR function and the "−1s" in the 4-bit output of the binarized [−1, +1] space maps to the "0s" in the binary output of the XNOR function.

TABLE 2

| XNOR | 0 | 1 |
|---|---|---|
| 0 | 1 | 0 |
| 1 | 0 | 1 |

TABLE 3

| Multiply | 0 | 1 |
|---|---|---|
| 0 | 0 | 0 |
| 1 | 0 | 1 |

In contrast, the binary multiplication in the binarized [−1, +1] space does not map to the binary multiplication in a binarized [0, 1] space shown in TABLE 3. For example, TABLE 3 illustrates multiplication in the binarized [0, 1] space to produce a 4-bit output of "0,0,0,1," which does not map with the 4-bit output of "1,−1,−1,1" in the binarized [−1, +1] space. For example, the 4-bit output of "0,0,0,1," includes only one true bit (e.g., the last bit) while the 4-bit output of "1,−1,−1,1" includes two true bits (e.g, the first bit and the last bit).

Conventionally, binary neural networks implemented with compute-in-memory systems are realized by computing XNOR at each bit cell and summing the results along each bit line to generate output values. However, adding an XNOR function in each bit cell is expensive. For example, the number of transistors for each cell in the memory (e.g., SRAM) increases from six or eight to twelve, which significantly increases cell size and power consumption.

Aspects of the present disclosure are directed to reducing size and improving power consumption of the memory by eliminating XNOR in a binary neural network compute-in-memory array. In one aspect, an activation threshold for each column of the compute-in-memory array is adjusted to avoid the use of the XNOR function and its corresponding transistor(s) in each bit cell. For example, a smaller memory (e.g., eight transistor SRAM) with smaller memory bit cells can be used for compute-in-memory binary neural networks.

Figure 4:
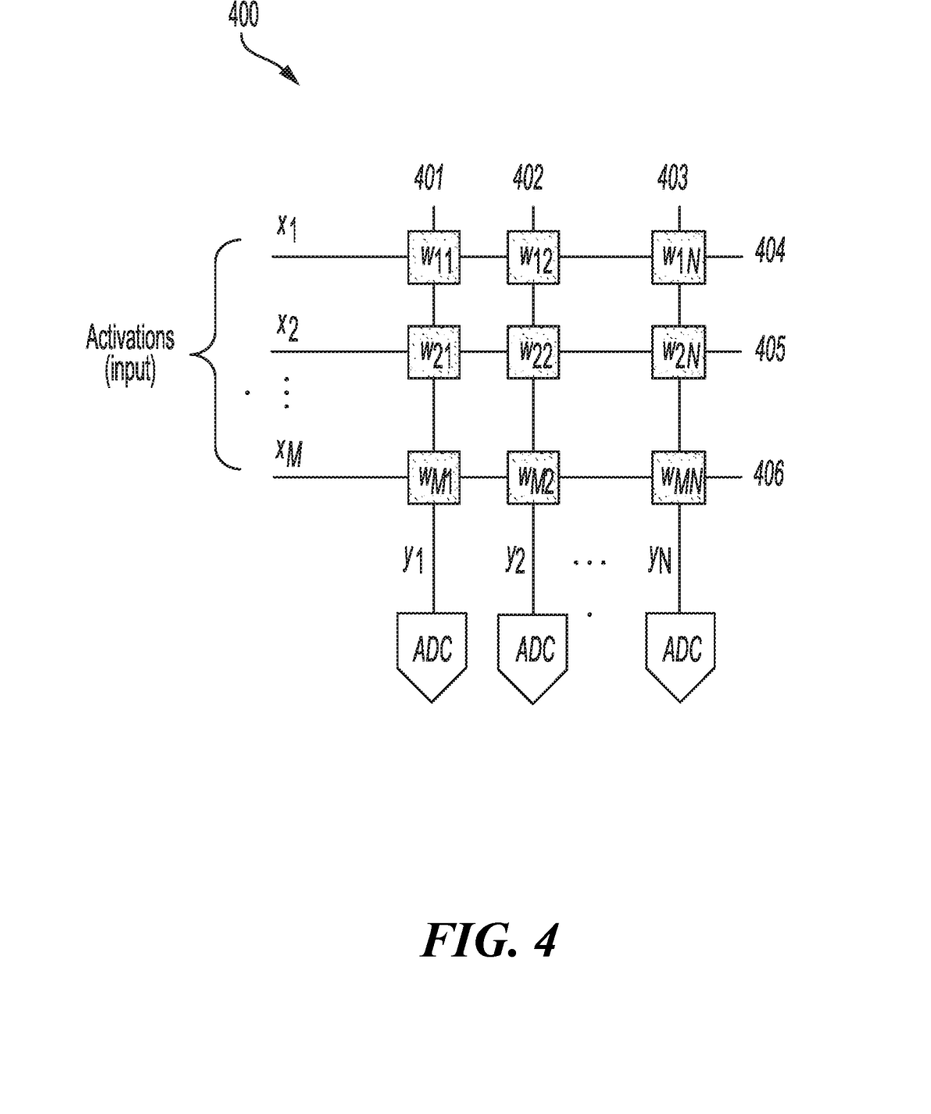
FIG. 4 illustrates an architecture showing a compute-in-memory (CIM) array of an artificial neural network, according to aspects of the present disclosure.

FIG. 4 illustrates an exemplary architecture 400 for a compute-in-memory (CIM) array of an artificial neural network, according to aspects of the present disclosure. Compute-in-memory is a way of performing multiply and accumulate operations in a memory array. The memory array includes word lines 404 (or $WL_1$), 405 (or $WL_2$) . . . 406 (or $WL_M$) as well as bit lines 401 (or $BL_1$), 402 (or $BL_2$) . . . 403 (or $BL_N$). Weights (e.g., a binary synaptic weight values) are stored in the bitcells of the memory array. The input activations (e.g., input value that may be an input vector) are on the word lines. The multiplication happens at each bitcell and the results of the multiplication are output through the bit lines. For example, the multiplication includes multiplying the weights with the input activations at each bitcell. A summing device (not shown), such as a voltage/current summing device, associated with the bit lines or columns (e.g., 401) sums the output (e.g., charge, current or voltage) of the bit lines and passes the result (e.g., output) to an analog-to-digital converter (ADC). For example, a sum of each bit line is calculated from the respective outputs of the bitcells of each bit line.

In one aspect of the disclosure, an activation threshold adjustment is made at each column (corresponding to the bit lines) instead of at each bit cell to improve area efficiency.

Conventionally, starting with a binary neural network implementation where the weights and neuron activations are binarized to −1 or +1 ([−1,+1] space), the multiply and accumulate operations becomes an XNOR operation (in the bit cell) with an XNOR outcome and a population count of the XNOR outcomes. For example, the population count of a bit line includes the sum of the positive (e.g., "1") outcomes of each bit cell of the bit line. The ADC functions like a comparator by using the activation threshold. For example, the population count is compared to the activation threshold or criteria by the ADC. If the population count is greater than the activation threshold, then the output of the bit line is a "1." Otherwise, if the population count is less than or equal to the activation threshold, then the output of the bit line is a "0." However, it is desirable to eliminate the XNOR function and its corresponding transistor(s) in each bit cell to reduce the size of the memory. Specific techniques for adjusting the activation threshold are as follows:

A convolutional layer of a neural network (e.g., a binary neural network) may include cells (e.g., bit cells) organized into an array (e.g., a compute-in-memory array). The cells include gated devices in which electrical charge level present in the gated devices represent stored weight of the array. A trained XNOR binary neural network having an array M rows (e.g., size of the input vector) and N columns include M×N binary synaptic weights $W_{ij}$, which are the weight in binary value [−1, +1], and the N activation thresholds $C_j$. The inputs to the array may correspond to word lines and the output may correspond to bit lines. For example, the input activations $X_i$, which are the input in binary value [−1, +1], are $X_1, X_2 \ldots X_M$. A sum of the products of the inputs with corresponding weights ($\Sigma_i^M X_i W_{ij}$) is known as a weighted sum $Y_j = \Sigma_i^M X_i W_{ij}$.

For example, when the weighted sum is greater than the activation threshold $C_j$, then the output is equal to one (1). Otherwise, the output is equal to zero (0). The XNOR binary neural network can be mapped into a non-XNOR binary neural network in the [0,1] space while eliminating the XNOR function and its corresponding transistor(s) in each bit cell to reduce the size of the memory. In one aspect, the XNOR binary neural network can be mapped into a non-XNOR binary neural network with an adjustment in the activation threshold $C_j$ of each column, as follows:

Equation 1 illustrates a relationship between the sum of the products of the inputs with corresponding weights and the activation threshold $C_j$ with respect to the XNOR binary neural network:

$$Y_j = \Sigma_i^M X_i W_{ij} > C_j \qquad (1)$$

where
- $X_i$ (e.g., $X_1, X_2 \ldots X_M$) is input in binary value [−1, +1]
- $W_{ij}$ is weight in binary value [−1, +1] (e.g., M×N matrix);
- $Y_j$ (e.g., $Y_1, Y_2 \ldots Y_N$) is the output of the bit lines in binary value [−1, +1]

Conventionally, compute-in-memory binary neural network implementations are achieved by completing XNOR operations at each bit cell and summing the result for each bit line. Adding an XNOR function in each bit cell, however, increases layout area and increases power consumption. For example, the number of transistors in each cell in the memory (e.g., SRAM) increases from six or eight to twelve. Accordingly, aspects of the present disclosure are directed to transforming multiply and accumulate operations for a compute-in-memory array of an artificial neural network (e.g., a binary neural network) from the [−1,+1] space to the [0,1] space using activation threshold adjustments.

The binary neural network is converted from the [−1,+1] space (where $Y_j = \Sigma_i^M X_i W_{ij} > C_j$) to the [0,1] space and the output of the bit lines in the [0,1] space is compared to a different threshold (e.g., the derivation of which is discussed below), as follows:

$$\Sigma_i^M \widetilde{X_i} \widetilde{W_{ij}} > \widetilde{C_j} + \widetilde{C_b} \qquad (2)$$

$\widetilde{X_i}$ is input in binary value [0, 1]

$\widetilde{W_{ij}}$ is weight in binary value [0, 1]

where $\widetilde{C_j}$ corresponds to the adjustable activation (or adjusted activation threshold) in the [0,1] space and $\widetilde{C_b}$ represents a conversion bias (e.g., a conversion bias current reference) in the [0,1] space.

Adjusting the activation threshold as described herein allows for avoiding/forgoing implementing XNOR functionality in each bit cell while getting the same outcome as if the XNOR functionality was implemented. Adjusting the activation threshold enables the use of a simpler and smaller memory bit cell (e.g., an eight transistor (8T) SRAM).

The following equations (3 and 4) include variables for mapping a network in the [−1,+1] space to the [0,1] space:

$$X_i = 2\widetilde{X_i} - 1 \qquad (3)$$

$$W_{ij} = 2\widetilde{W_{ij}} - 1, \qquad (4)$$

Inserting the values of equations three (3) and four (4) into equation 1, an adjusted activation threshold can be determined through conversion or transformation between the [−1,+1] space and the [0,1] space. The following is a derivation of the adjusted activation threshold:

$$Y_j = \Sigma_i^M X_i W_{ij} = \Sigma_i^M (2\widetilde{X_i} - 1)(2\widetilde{W_{ij}} - 1) \qquad (5)$$

Expanding equation 5:

$$Y_j = 4\sum_i^M (\widetilde{X}_t \cdot \widetilde{W}_{tj}) - 2\sum_i^M \widetilde{W}_{tj} - 2\sum_i^M \widetilde{X}_t + \sum_i^M 1 \quad (6)$$

Comparing the output of the bit lines $Y_j$ in binary value [−1, +1] to the activation threshold $C_j$ in the [−1, +1] space (as in equation 1)

$$Y_j > C_j$$

Inserting the value of the output of the bit lines $Y_j$ in equation 6 to equation 1 to obtain a population count per bit line in the [0,1] space $(\Sigma_i^M(\widetilde{X}_t \cdot \widetilde{W}_{tj}))$ $$4\sum_i^M (\widetilde{X}_t \cdot \widetilde{W}_{tj}) - 2\sum_i^M \widetilde{W}_{tj} - 2\sum_i^M \widetilde{X}_t + \sum_i^M 1 > C_j \quad (7)$$

$$4\sum_i^M (\widetilde{X}_t \cdot \widetilde{W}_{tj}) > 2\sum_i^M \widetilde{W}_{tj} + 2\sum_i^M \widetilde{X}_t - \sum_i^M 1 + C_j \quad (8)$$

$$\sum_i^M (\widetilde{X}_t \cdot \widetilde{W}_{tj}) > \frac{1}{2}\sum_i^M \widetilde{W}_{tj} + \frac{c_j - M}{4} + \frac{1}{2}\sum_i^M \widetilde{X}_t \quad (9)$$

Mapping the population count per bit line in the [0,1] space $(\Sigma_i^M(\widetilde{X}_t \cdot \widetilde{W}_{tj}))$ in equation 9 to the population count per bit line in the [−1, +1] space $(\Sigma_i^M X_i W_{ij})$, the N activation thresholds $C_j$ in the [−1, +1] space maps to the adjustable activations $\widetilde{C}_j$ as well as conversion bias $\widetilde{C}_b$ in the [0,1] space. For example, to achieve the non-XNOR binary neural network in the [0,1] space while eliminating the XNOR function and its corresponding transistor(s) the adjustable activations $\widetilde{C}_j$ as well as the conversion bias $\widetilde{C}_b$ in the [0,1] space are used.

Referring to equation 9, the function $$\frac{1}{2}\sum_i^M \widetilde{W}_{tj} + \frac{c_j - M}{4}$$

is used to determine the adjustable activations $\widetilde{C}_j$. For example, an element $$\frac{c_j - M}{4}$$

correspond to activation values of the adjustable activations $\widetilde{C}_j$. The adjustable activations $\widetilde{C}_j$, do not depend on activation inputs $X_i$. The adjustable activations $\widetilde{C}_j$ are also made up of predetermined parameters (e.g., binary synaptic weights $W_{ij}$) that can be changed to adjust activation thresholds $C_j$.

The function $\frac{1}{2}\Sigma_i^M \widetilde{X}_t$ is used to determine the conversion bias $\widetilde{C}_b$. The conversion bias $\widetilde{C}_b$ only depends on the input activations. This means that the conversion bias is constantly changing as new inputs are received.

For example, when $C_j = 0$; $\Sigma_i^M \widetilde{W}_{tj} = \frac{1}{2}M$; and $\Sigma_i^M \widetilde{X}_t = \frac{1}{2}M$, the values of $\widetilde{C}_j$, $\widetilde{C}_b$ and $\Sigma_i^M(\widetilde{X}_t \cdot \widetilde{W}_{tj})$ are calculated as follows with respect to equation 9:

$$\widetilde{C}_j = \frac{1}{2}\sum_i^M \widetilde{W}_{tj} + \frac{c_j - M}{4} = \frac{1}{2} * \frac{1}{2}M + \frac{0 - M}{4} = \frac{M}{4} - \frac{M}{4} = 0;$$

$$\widetilde{C}_b = \frac{1}{2}\sum_i^M \widetilde{X}_t = \frac{1}{2} * \frac{1}{2}M = \frac{1}{4}M; \text{ and}$$

$$\sum_i^M (\widetilde{X}_t \cdot \widetilde{W}_{tj}) > \widetilde{C}_j + \widetilde{C}_b = 0 + \frac{1}{4}M = \frac{1}{4}M$$

Similarly, when $C_j = \frac{1}{2}M$; $\Sigma_i^M \widetilde{W}_{tj} = \frac{1}{2}M$; and $\Sigma_i^M \widetilde{X}_t = \frac{1}{2}M$, the values of $\widetilde{C}_j$, $\widetilde{C}_b$ and $\Sigma_i^M(\widetilde{X}_t \cdot \widetilde{W}_{tj})$ are calculated as follows with respect to equation 9:

$$\widetilde{C}_j = \frac{1}{2}\sum_i^M \widetilde{W}_{tj} + \frac{c_j - M}{4} = \frac{1}{2} * \frac{1}{2}M + \frac{\frac{1}{2}M - M}{4} = \frac{M}{4} - \frac{M}{8} = \frac{1}{8}M;$$

$$\widetilde{C}_b = \frac{1}{2}\sum_i^M \widetilde{X}_t = \frac{1}{2} * \frac{1}{2}M = \frac{1}{4}M; \text{ and}$$

$$\sum_i^M (\widetilde{X}_t \cdot \widetilde{W}_{tj}) > \widetilde{C}_j + \widetilde{C}_b = \frac{1}{8}M + \frac{1}{4}M = \frac{3}{8}M$$

In some aspects, the function $\Sigma_i^M \widetilde{X}_t$ can be used to generate generated the conversion bias $\widetilde{C}_b$ from a reference column (e.g., a bit line that is not part of the N bit lines, which is used as a reference) by setting the weight in binary value $\widetilde{W}_{tj}$ equal to 1. Inserting the value of $\widetilde{W}_{tj}$ equal to 1 in equation 9, the resulting equation is as follows:

$$\sum_i^M (\widetilde{X}_t \cdot 1) > \frac{1}{2}M + \frac{c_j - M}{4} + \frac{1}{2}\sum_i^M \widetilde{X}_t \quad (9)$$

The population count is equal to $\Sigma_i^M \widetilde{X}_t \cdot 1$, which can be used to offset the activation current. Thus, only a single column is specified to determine a reference bias value or conversion bias for the whole memory array.

Figure 5:
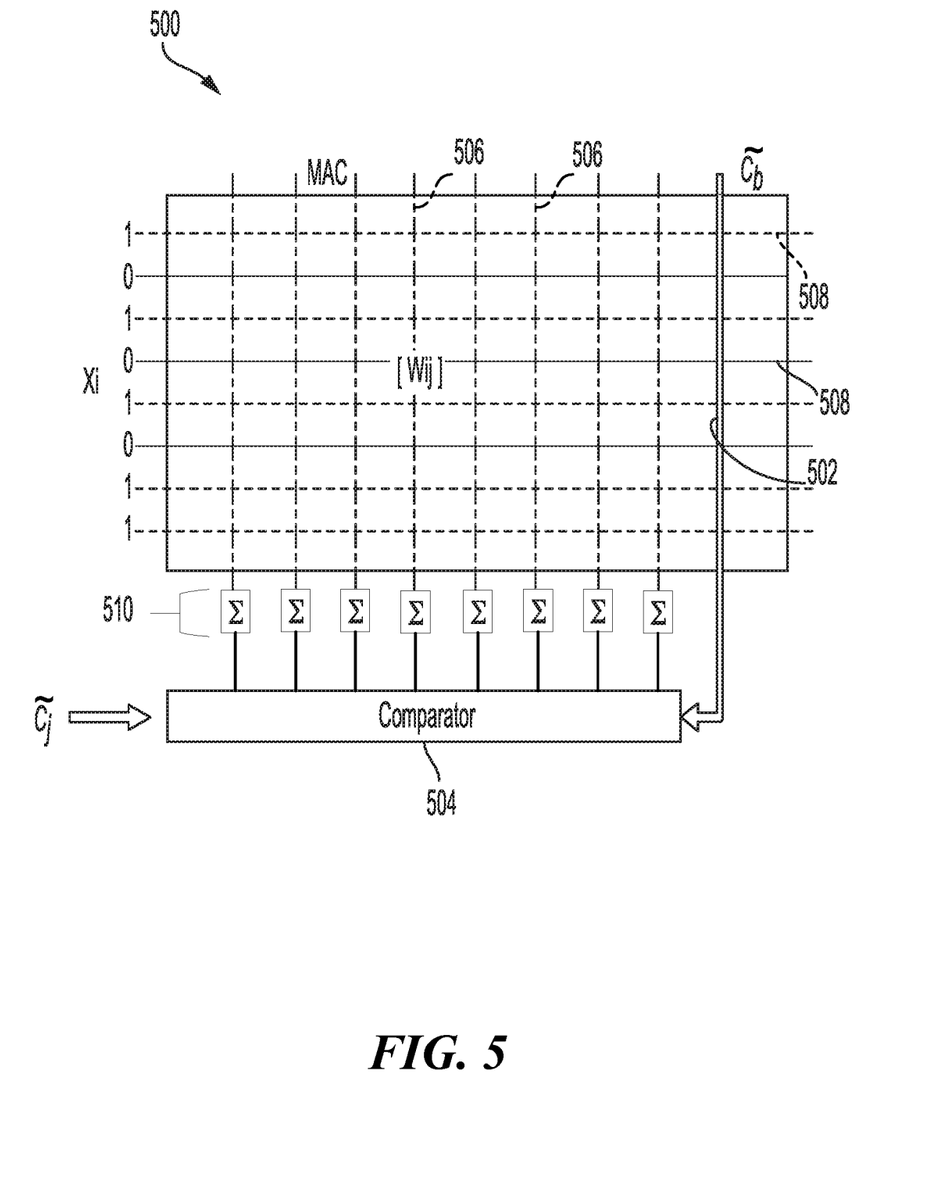
FIG. 5 illustrates an architecture for performing XNOR-equivalent operations by adjusting column thresholds of a compute-in-memory array of an artificial neural network, according to aspects of the present disclosure.

FIG. 5 illustrates an exemplary architecture 500 for performing XNOR-equivalent operations by adjusting column thresholds of a compute-in-memory array of an artificial neural network, according to aspects of the present disclosure. The architecture includes a memory array including a reference column 502, a comparator 504, bit lines 506 (corresponding to columns of the memory array), and word lines 508 (corresponding to rows of the memory array). The input activations are received via word lines. In one example, the binary values of the input activations $X_i$ are 10101011.

The multiplication (e.g., $X_i W_{ij}$) happens at each bitcell and the results of the multiplication from each bitcell are output through the bit lines 506. A summing device 510 associated with each of the bit lines 506 sums each output of the bitcells of the memory array and passes the result to the comparator 504. The comparator 504 may be part of the analog-to-digital converter (ADC), shown in FIG. 4. In one aspect, the output of each bitcell associated with a first bit line is summed separately from the output of each bitcell associated with a second bit line.

The activation threshold adjustment occurs at each column (corresponding to the bit lines) instead of at each bit cell, to improve area efficiency. For example, the sum of the output (or population count) of each bitcell associated with the first bit line is provided to the comparator 504 as a first input. A second input of the comparator includes a sum of the adjustable activation $\widetilde{C}_j$ and the conversion bias $\widetilde{C}_b$ (e.g., conversion bias current reference). For example, the conversion bias $\widetilde{C}_j$ can be programmed into a criterion (e.g., the reference column 502) for each of the bit lines 506.

When the population count is greater than the sum of the adjustable activation and the conversion bias $\widetilde{C_b}$, then the output of the comparator 504, which corresponds to the output of the first bit line, is a "1." Otherwise, if the population count is less than or equal to the sum of the adjustable activation $\widetilde{C_j}$ and the conversion bias $\widetilde{C_b}$, then the output of the comparator, which corresponds to the output of the first bit line, is a "0." Thus, each bit line population count is compared to the sum of the adjustable activation $\widetilde{C_j}$ and the conversion bias $\widetilde{C_b}$.

Figure 6:
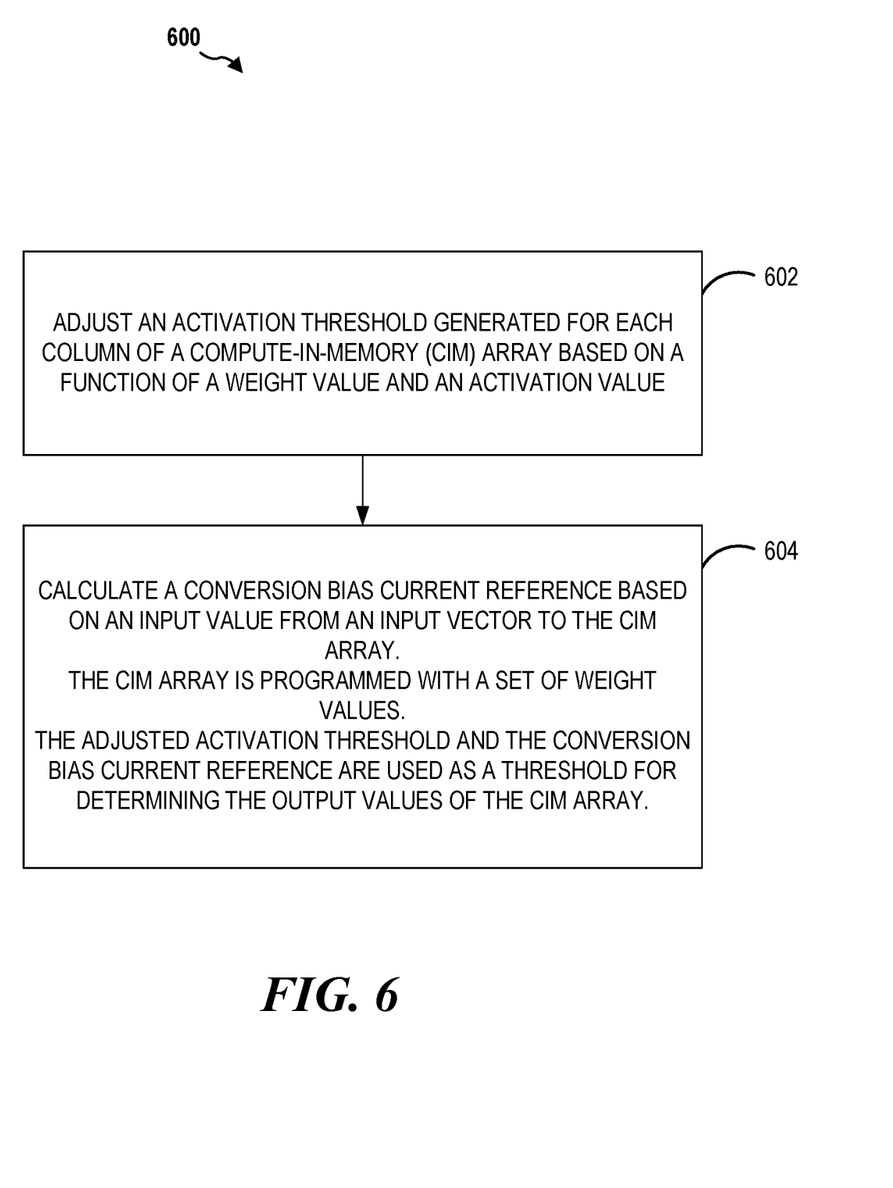
FIG. 6 illustrates a method for performing XNOR-equivalent operations by adjusting column thresholds of a compute-in-memory array of an artificial neural network, in accordance with aspects of the present disclosure.

FIG. 6 illustrates a method 600 for performing XNOR-equivalent operations by adjusting column thresholds of a compute-in-memory array of an artificial neural network, in accordance with aspects of the present disclosure. As shown in FIG. 6, at block 602, an activation threshold generated for each column of the compute-in-memory array can be adjusted based on a function of a weight value and an activation value. At block 604, a conversion bias current reference is calculated based on an input value from an input vector to the compute-in-memory array, the compute-in-memory array being programmed with a set of weight values. Each of the adjusted activation threshold and the conversion bias current reference is used as a threshold for determining the output values of the compute-in-memory array. The compute-in-memory array has both columns and rows.

According to a further aspect of the present disclosure, an apparatus for performing XNOR-equivalent operations by adjusting column thresholds of a compute-in-memory array of an artificial neural network is described. The apparatus includes means for adjusting an activation threshold for each column of the array based on a function of a weight value and an activation value. The adjusting means includes the deep convolutional network 200, the deep convolutional network 350, the convolutional layer 232, the SoC 100, the CPU 102, the architecture 500, the architecture 400, and/or the convolutional block 354A. The apparatus further includes means for calculating a conversion bias current reference based on an input value from an input vector. The calculating means includes the deep convolutional network 200, the deep convolutional network 350, the convolutional layer 232, the SoC 100, the CPU 102, the architecture 500, the architecture 400 and/or the convolutional block 354A.

The apparatus further includes means for comparing a bit line population count to a sum of the conversion bias current reference and the adjusted activation threshold in order to determine an output of a bit line. The comparing means includes the comparator 504 of FIG. 5, and/or the analog-to-digital converter (ADC) of FIG. 4. In another aspect, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g.,

RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. An apparatus comprising:
a compute-in-memory array comprising rows and columns, the compute-in-memory array configured:
to adjust an activation threshold generated for each column of the compute-in- memory array based on a function of a weight value and an activation value; and
to calculate a conversion bias current reference based on an input value from an input vector to the compute-in-memory array, the compute-in-memory array programmed with a set of weight values, in which the adjusted activation threshold and the conversion bias current reference are used as a threshold for determining output values of the compute-in-memory array.

2. The apparatus of claim 1, further comprising a comparator configured to compare a bit line population count to a sum of the conversion bias current reference and the adjusted activation threshold in order to determine an output of a bit line.

3. The apparatus of claim 1, in which an artificial neural network including the compute-in-memory array comprises a binary neural network.

4. The apparatus of claim 1, in which the activation threshold is less than half of a number of rows of the compute-in-memory array, the number of rows corresponding to a size of the input vector.

5. The apparatus of claim 1, in which the conversion bias current reference is less than half of a number of rows of the compute-in-memory array, the number of rows corresponding to a size of the input vector.

6. A processor-implemented method comprising:
adjusting an activation threshold generated for each column of the compute-in-memory array having rows and columns based on a function of a weight value and an activation value;
calculating a conversion bias current reference based on an input value from an input vector to the compute-in-memory array, the compute-in-memory array being programmed with a set of weight values, in which the adjusted activation threshold and the conversion bias current reference are used as a threshold for determining output values of the compute-in-memory array.

7. The processor-implemented method of claim 6, further comprising comparing a bit line population count to a sum of the conversion bias current reference and the adjusted activation threshold in order to determine an output of a bit line.

8. The processor-implemented method of claim 6, in which an artificial neural network including the compute-in-memory array comprises a binary neural network.

9. The processor-implemented method of claim 6, in which the activation threshold is less than half of a number of rows of the compute-in-memory array, the number of rows corresponding to a size of the input vector.

10. The processor-implemented method of claim 6, in which the conversion bias current reference is less than half of a number of rows of the compute-in-memory array, the number of rows corresponding to a size of the input vector.

11. A non-transitory computer-readable medium having program code recorded thereon, the program code being executed by a processor and comprising:
program code to adjust an activation threshold generated for each column of a compute-in-memory array having rows and columns based on a function of a weight value and an activation value; and
program code to calculate a conversion bias current reference based on an input value from an input vector to the compute-in-memory array, the compute-in-memory array being programmed with a set of weight values, in which the adjusted activation threshold and the conversion bias current reference are used as a threshold for determining output values of the compute-in-memory array.

12. The non-transitory computer-readable medium of claim 11, further comprising program code to compare a bit line population count to a sum of the conversion bias current reference and the adjusted activation threshold in order to determine an output of a bit line.

13. The non-transitory computer-readable medium of claim 11, in which an artificial neural network subject to the adjusting and the calculating comprises a binary neural network.

14. The non-transitory computer-readable medium of claim 11, in which the activation threshold is less than half of a number of rows of the compute-in-memory array, the number of rows corresponding to a size of the input vector.

15. The non-transitory computer-readable medium of claim 11, in which the conversion bias current reference is less than half of a number of rows of the compute-in-memory array, the number of rows corresponding to a size of the input vector.

16. An apparatus comprising:
means for adjusting an activation threshold generated for each column of the compute-in- memory array having rows and columns based on a function of a weight value and an activation value; and
means for calculating a conversion bias current reference based on an input value from an input vector to the compute-in-memory array, the compute-in-memory array being programmed with a set of weight values, in which the adjusted activation threshold and the conversion bias current reference are used as a threshold for determining output values of the compute-in-memory array.

17. The apparatus of claim 16, further comprising means for comparing a bit line population count to a sum of the conversion bias current reference and the adjusted activation threshold in order to determine an output of a bit line.

18. The apparatus of claim 16, in which an artificial neural network including the compute-in-memory array comprises a binary neural network.

19. The apparatus of claim 16, in which the activation threshold is less than half of a number of rows of the compute-in-memory array, the number of rows corresponding to a size of the input vector.

20. The apparatus of claim 16, in which the conversion bias current reference is less than half of a number of rows of the compute-in-memory array, the number of rows corresponding to a size of the input vector.

* * * * *